P. DENCHEFF.
LOCK FOR MOTOR VEHICLES.
APPLICATION FILED MAR. 10, 1919.
1,323,166.
Patented Nov. 25, 1919.
2 SHEETS—SHEET 1.
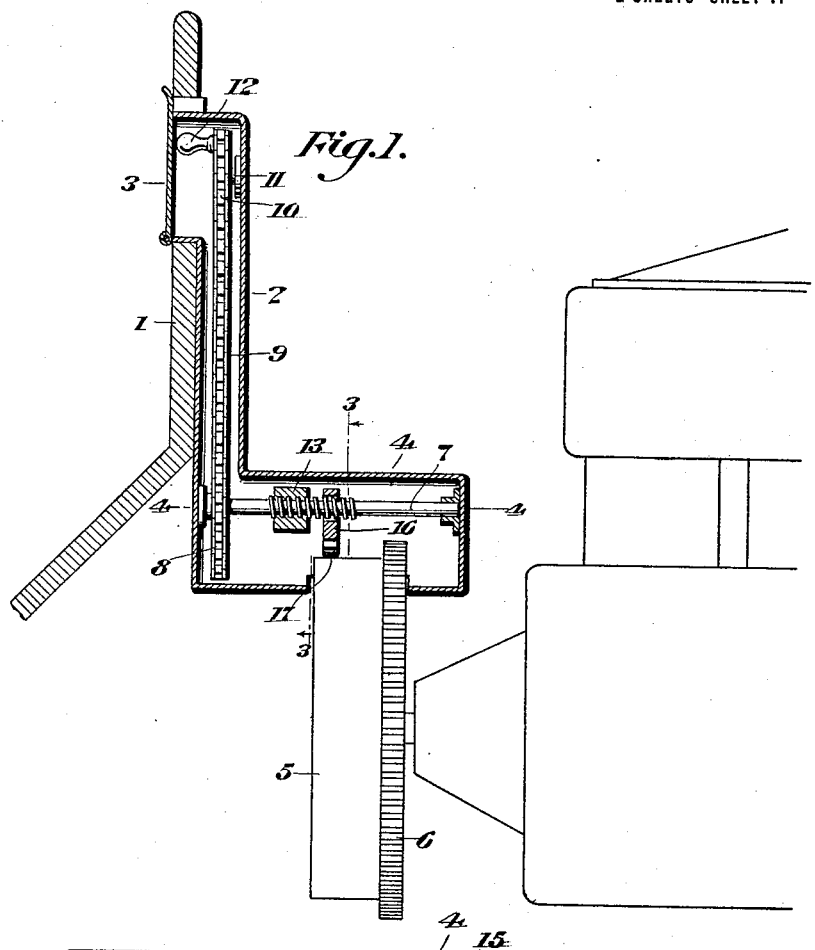
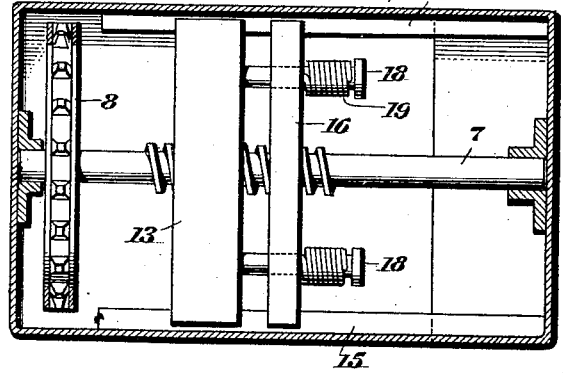
Witnesses
Inventor
Peter Dencheff
By Victor J. Evans
Attorney

P. DENCHEFF.
LOCK FOR MOTOR VEHICLES.
APPLICATION FILED MAR. 10, 1919.

1,323,166.

Patented Nov. 25, 1919.
2 SHEETS—SHEET 2.

WITNESS:

INVENTOR.
Peter Dencheff
BY
Victor J. Evans
ATTORNEY.

UNITED STATES PATENT OFFICE.

PETER DENCHEFF, OF AKRON, OHIO.

LOCK FOR MOTOR-VEHICLES.

1,323,166.  Specification of Letters Patent.  Patented Nov. 25, 1919.

Application filed March 10, 1919. Serial No. 281,628.

*To all whom it may concern:*

Be it known that I, PETER DENCHEFF, a citizen of Bulgaria, residing at Akron, in the county of Summit and State of Ohio, have invented new and useful Improvements in Locks for Motor-Vehicles, of which the following is a specification.

This invention relates to means for locking automobiles against use by unauthorized persons during the owner's absence.

The principal object of the invention is to provide means for engaging the fly wheel to prevent movement of the same.

Another object of the invention is to provide means for actuating the fly wheel engaging member from a point adjacent the driver's seat and to prevent access to said means by a door provided with a lock.

Still another object of the invention is to provide spring means for preventing injury to the parts when the locking member is moved into engagement with the fly wheel.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a sectional view showing the invention in use;

Fig. 4 is a horizontal section on line 4—4 of Fig. 1.

Figure 2:
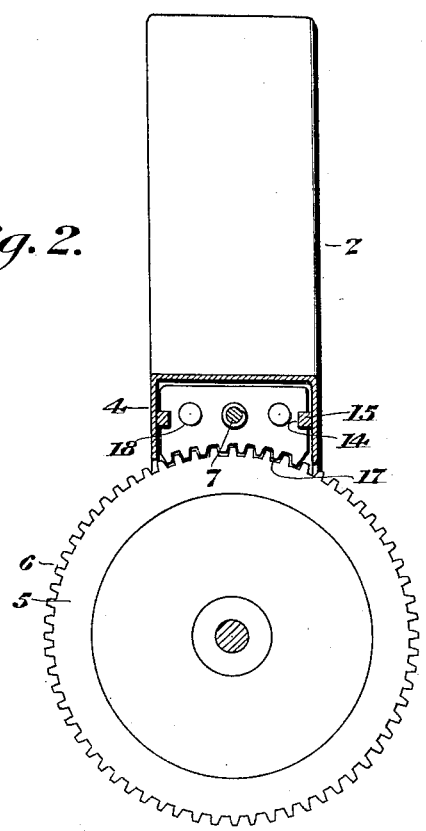
Fig. 2 is a front view with parts in section.
Figure 3:
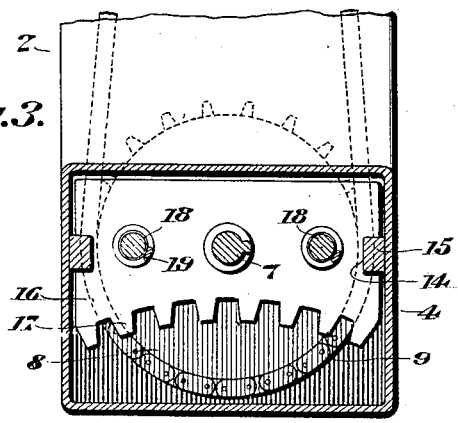
Fig. 3 is a sectional view on the line 3—3 of Fig. 1.

In these views 1 indicates the dash board of the automobile and to this dash board I secure a casing 2 for inclosing the parts of my device. I form an opening in the dash and provide a door 3 for the same which is held in closed position by any suitable form of lock. The lower part of the casing is provided with the right angular extension 4 which incloses the upper part of the fly wheel 5 of the automobile. This wheel is provided with the teeth 6 for engaging the toothed wheel of the self-starter which is not shown. A shaft 7 provided with a worm is journaled in the lower part of the casing. This shaft has keyed thereto a chain wheel 8 which engages a chain 9, the upper part of which extends over a chain wheel 10 located on a shaft 11 journaled in the upper part of the casing. This wheel 10 is provided with a crank 12 by which the same may be revolved by the hand of the operator thrust through the opening in the dash. The locking member consists of a block 13 having a screw-threaded opening therein for engaging the worm on the shaft 7 and this block is provided with the guideways 14 for engaging on guides 15 on the sides of the casing. The block has connected therewith a plate 16 which is provided with a curved lower edge having the teeth 17 formed thereon. The curve of said lower edge is made to conform with a portion of the periphery of the fly wheel so that when the block is moved over said fly wheel the teeth 17 will engage with the teeth 6 on said fly wheel and thus lock the fly wheel against movement. The plate 16 is connected with the block by means of the bolts 18 and springs 19 on said bolts hold the plate away from the block.

When it is desired to lock the automobile against movement the door 3 is opened and the crank 12 is operated to set the parts in motion to rotate the shaft 7 and thus cause the locking member to move over the fly wheel. This will place the teeth on the plate 16 in engagement with the teeth 6 on the fly wheel and thus lock the fly wheel against movement. The door is then closed and locked and the automobile cannot be moved by an unauthorized person. When the driver of the automobile returns he unlocks the door and rotates the crank in the opposite direction to move the locking member away from the fly wheel so as to free the fly wheel.

If the teeth on the fly wheel and those on the locking member should be out of alinement when the locking member is moved into locking position the springs will permit the plate to be moved toward the block when the teeth on the plate strike against the fly wheel. The springs hold the plate under tension and as soon as the fly wheel is moved sufficiently to place the teeth in register said springs will cause the plate to snap back into normal position with its teeth engaging the spaces between the teeth of the fly wheel.

It will be seen that my invention may be easily applied to existing models of automobiles. The lower part of the casing must be made to make a close fitting with the upper part of the fly wheel to prevent a person from passing his hand through the bottom of the casing to move the locking member.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. The combination with the fly wheel of an automobile, of a member adapted to engage therewith to prevent movement thereof, hand-operated means for actuating said member, a casing inclosing said operating means, and a door in said casing for permitting access to said operating means.

2. The combination with the fly wheel of an automobile, of a locking member adapted to engage the fly wheel to prevent movement thereof, means for actuating said member and spring means carried by said member for yieldingly pressing the same against the fly wheel.

3. The combination with the fly wheel of an automobile, of a locking member adapted to engage therewith to prevent movement thereof, a worm shaft for moving said member, a toothed wheel on said shaft, a second shaft, a toothed wheel thereon, a chain connecting said wheels together, a crank connected with the second wheel and a casing inclosing the parts and provided with a door.

4. The combination with the fly wheel of an automobile, of a locking device therefor comprising a block and a plate, spring means for holding the plate spaced from the block and means for moving the locking device to place the plate in engagement with the fly wheel.

In testimony whereof I affix my signature.

PETER DENCHEFF.